Jan. 7, 1947. C. CARTER 2,413,744
MECHANICAL FLOOR CHOCK
Filed July 9, 1945 2 Sheets-Sheet 2
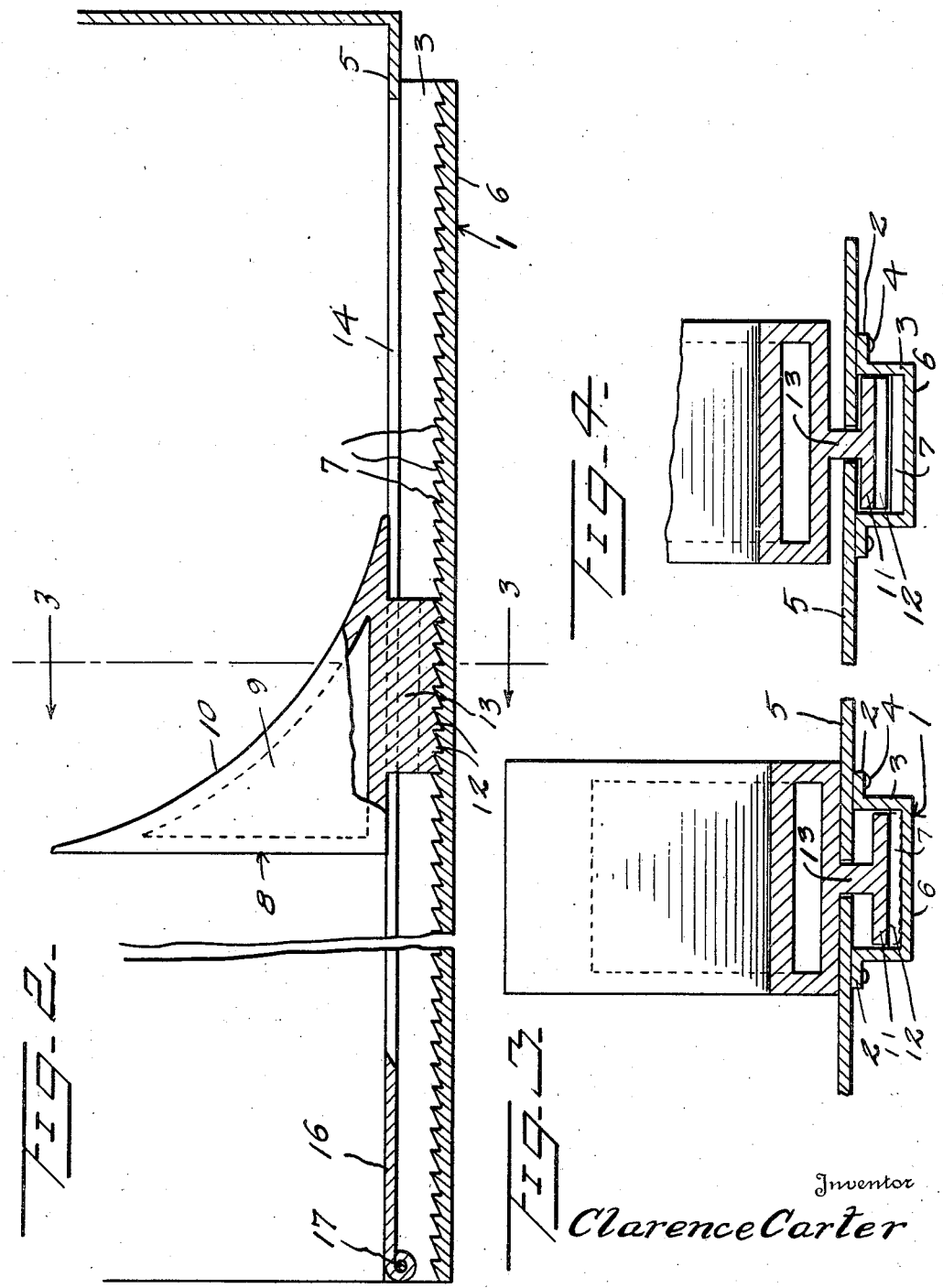
Inventor
Clarence Carter Patented Jan. 7, 1947

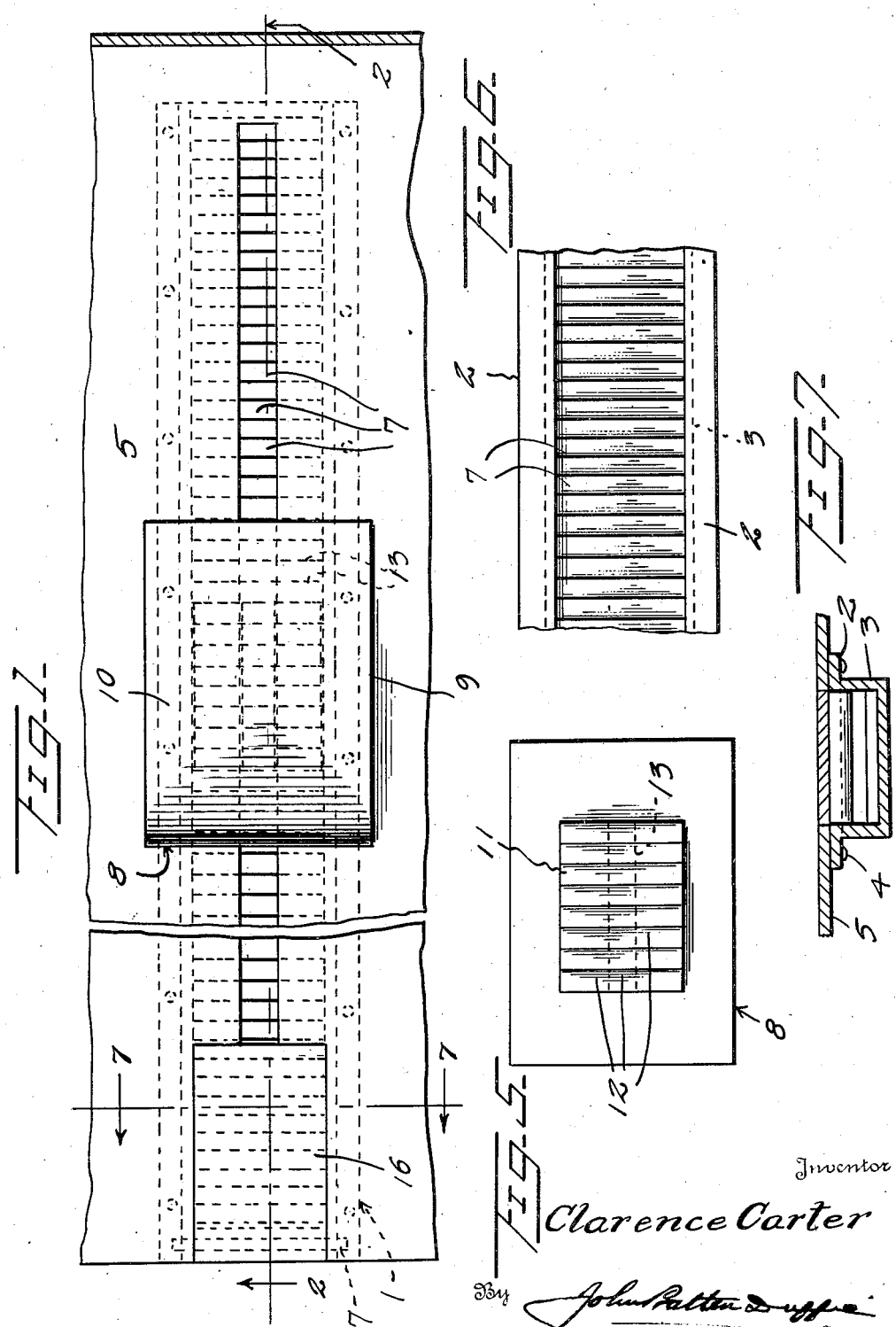

2,413,744

UNITED STATES PATENT OFFICE 2,413,744

MECHANICAL FLOOR CHOCK

Clarence Carter, Anderson, Ind.

Application July 9, 1945, Serial No. 603,983

1 Claim. (Cl. 280—179)

This invention relates to new and useful improvements in mechanical floor chocks for motor vehicles and trailers.

The primary object of my invention is to provide a mechanical floor chock for motor vehicles, trailers, or other moving vehicles, designed to fit firmly and snugly against any heavy cylindrical articles or objects of merchandise carried in such trucks and "chock" the article against possible slipping, vibration or damage during transportation.

A further object of my invention is to provide a mechanical floor chock of the character specified that is simple and economical in construction and highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a plan view, illustrating the application of my invention.

Figure 2 is a central longitudinal section, taken on line 2—2 of Figure 1.

Figure 3 is a vertical transverse section, taken on line 3—3 of Figure 2.

Figure 4 is a similar view, showing the chock block raised off the track preparatory to adjusting or removing the block from place.

Figure 5 is a bottom plan view of the chock block.

Figure 6 is a fragmentary plan view of the casing and track and Figure 7 is a vertical transverse section, taken on line 7—7 of Figure 1.

Referring to the drawings for a more particular description of my invention, and in which drawings like parts are designated by like reference characters throughout the several views, my device essentially comprises the rectangular oblong casing 1, of approximately U-shape form in cross section, and of suitable depth, which is secured by means of the horizontal flanges 2, formed along the upper edges of the side walls 3, and the rivets 4 or other equivalent means, to the floor 5 of the motor truck or other vehicle.

The bottom 6 of the casing 1 is formed on its upper face, throughout its entire length, with the forwardly inclined teeth or corrugations 7, constituting a track along which the chock block 8 is moved back and forth. The chock block 8 comprises the hollow upper body portion 9, whose inner face 10 is curved in the arc of a circle, and the lower depending inverted T-shaped head 11, whose bottom face is formed with the outwardly inclined teeth or corrugations 12, adapted to engage and co-act with the teeth or corrugations 7, and whose central web or neck 13 extends through and works in a corresponding slot 14 in the floor 5 of the motor truck or other vehicle.

In practice, the chock block 8 is moved along the track to engage its curved inner face 10 with the cylindrical article or object carried in the truck or other vehicle, and the latter may be provided with as many tracks as may be found necessary to meet the requirements.

A trap door 16 is hinged at its outer end, as at 17, to the floor at the outer end of the slot 14 and may be raised to permit the removal of the chock block from the track when not in use. As many chock blocks as required may be easily carried in the truck or other vehicle.

In adjusting the chock block backwardly along the track, or in sliding the block to the outer end of the track preparatory to removing same through the trap door when not in use, the block is first raised to disengage its teeth from those of the track.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claim.

Having described my invention, what I claim as new and desire to secure by Letters Patent is:

In a mechanical floor chock for motor trucks or other vehicles formed with a slotted floor, a toothed or corrugated track mounted in the floor of the vehicle, a chock block comprising an upper body portion with a curved inner face formed in the arc of a circle, adapted to engage any cylindrical article or object carried in the vehicle, and further comprising a depending toothed or corrugated inverted T-shaped head movable along and co-acting with said track, with its neck extending through and working in the slot of the floor, and a trap door hinged at its outer end to the floor at the outer end of its slotted portion to permit the removal of the chock block from the track when not in use.

CLARENCE CARTER.